No. 670,355.  
F. L. EZELL.  
PLOW.  
(Application filed Sept. 13, 1900.)  
Patented Mar. 19, 1901.
(No Model.)
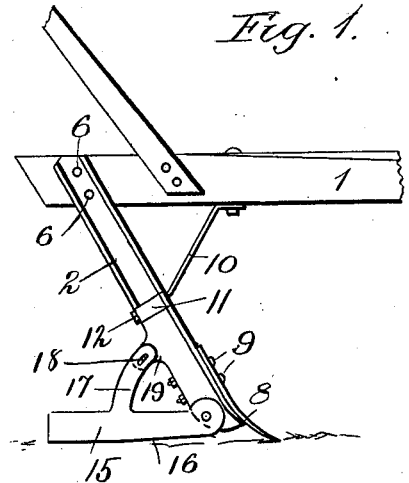
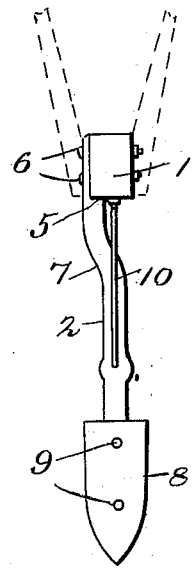
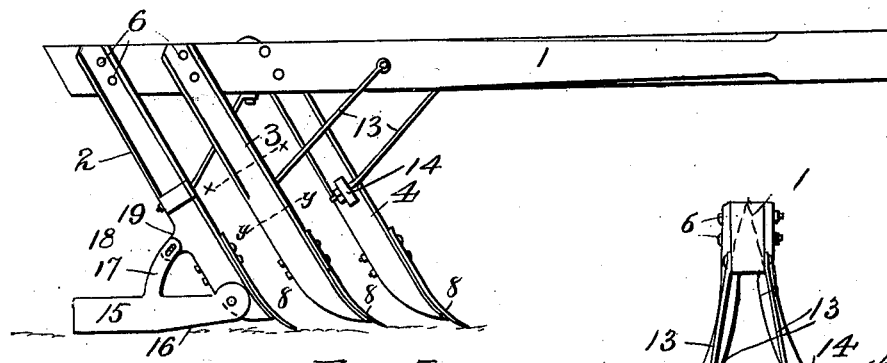
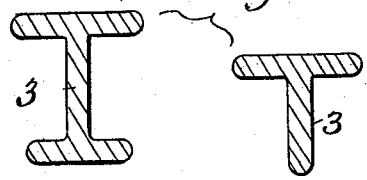
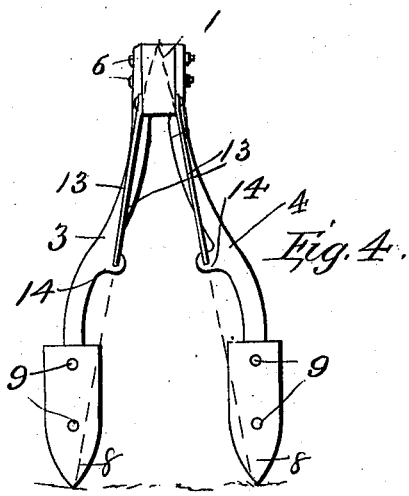
Witnesses:  
Franck L. Ourand  
E. R. Bunyea
Inventor.  
Francis L. Ezell,  
By Louis Bagger & Co.  
Attorneys

UNITED STATES PATENT OFFICE.

FRANCIS LAFAYETTE EZELL, OF WILKERSON, TENNESSEE.

PLOW.

SPECIFICATION forming part of Letters Patent No. 670,355, dated March 19, 1901.

Application filed September 13, 1900. Serial No. 29,921. (No model.)

*To all whom it may concern:*

Be it known that I, FRANCIS LAFAYETTE EZELL, a citizen of the United States, residing at Wilkerson, in the county of Davidson and State of Tennessee, have invented new and useful Improvements in Plows, of which the following is a specification.

My invention relates to plows; and one object of the same is to provide simple and efficient means for bracing and giving stability, steadiness, and proper balance to the plow.

Another object is to provide a plow which may be readily and quickly convertible for different kinds of work and which shall be capable of adjustment as to depth of furrow and which will be light of draft.

I attain these objects by means of the construction shown in the accompanying drawings, which form a part of the specification, and in which—

Figure 1 is a side view of my invention when used as a single-shovel plow. Fig. 2 is a front view of the same. Fig. 3 is a side view of my invention when arranged to be used as a triple-shovel plow or cultivator. Fig. 4 is a front view of the implement when arranged to be used as a straddle-row cultivator. Fig. 5 shows cross-sections of the standards on the lines $x\ x$ and $y\ y$, Fig. 3.

Like numerals of reference designate like parts wherever they occur in the different views.

In said drawings the numeral 1 designates the beam of my implement, and 2 3 4 the standards for the plows. The standard 2 for the central plow is provided with a shoulder 5, which bears against the bottom of the beam, and the upper end of this standard is secured to the beam by the two bolts 6 6. The standard is bent inward under the beam at 7 to aline therewith, so as to occupy a central position in relation thereto. The plow point or shovel 8 is secured to the lower end of the standard by the bolts 9. A brace-rod 10, secured at its front end under the beam forward of the standard 2, extends backward and through the center of the standard at 11 and is held in place by the nut 12 on the end of said brace-rod. The standards 3 and 4 are bent outward upon opposite sides of the beam, as shown in Fig. 4, and the brace-rods 13 for these standards are secured to the beam upon opposite sides, and the lower ends of the brace-rods pass through perforated lugs 14, which project inward from the standards. It will be noted that the brace-rods for all the standards are in the line of draft or in direct lines from the center of the beam to the points of the shovels, as indicated in dotted lines, Fig. 4. The standards in cross-section are I-shaped above the brace-rods and T-shaped below, as shown in Fig. 5.

At the rear of the standard 2 for the central plow a guide or regulator 15 is adjustably secured. This guide consists of a bearing-face 16, the front end of which is pivoted to the standard back of the shovel, and a curved arm 17, having a slotted end, bolted at 18 to a perforated lug 19 in rear of the standard 2. This guide may be adjusted to regulate the depth of the furrow, and it also serves as a guide to hold the plow to its work and to give stability in guiding.

Having thus fully described my invention, what I claim is—

A plow comprising a plurality of standards secured to the beam, the rear plow being located centrally under the beam, the other plows being located at equal distance at the sides of the beam, and brace-rods extending from the beam to the standards in direct lines from the center of the beam to the points of the plows, substantially as described.

In testimony whereof I have hereunto set my hand in presence of two subscribing witnesses.

FRANCIS LAFAYETTE EZELL.

Witnesses:
C. B. LANE,
R. D. EZELL.